Jan. 26, 1965     L. J. DELANEY, JR     3,166,860
EDUCATIONAL TESTING DEVICE
Filed July 5, 1963     2 Sheets-Sheet 1
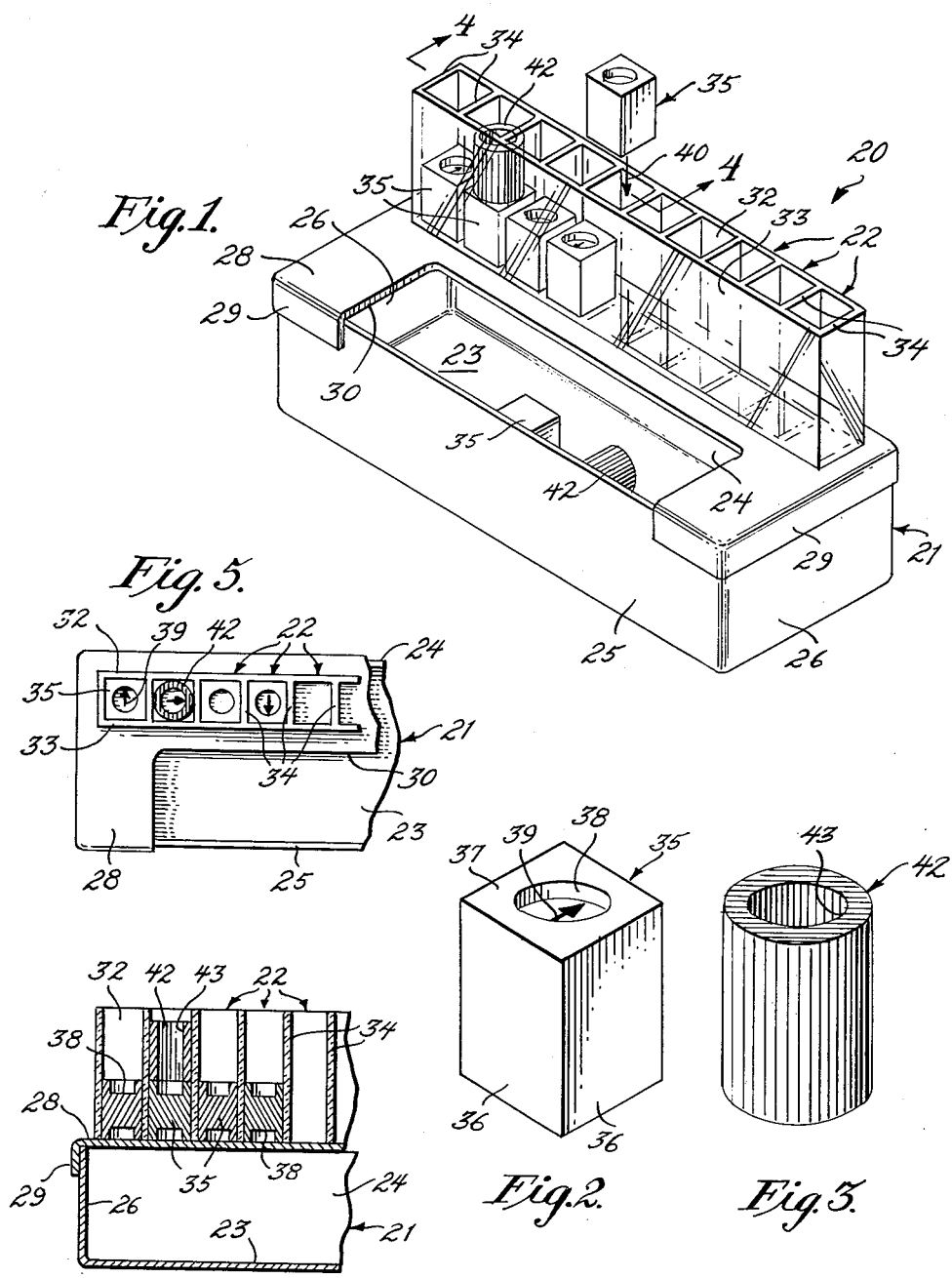
INVENTOR.
LAWRENCE JOSEPH DELANEY, JR.
BY Robert K. Youtie
ATTORNEY

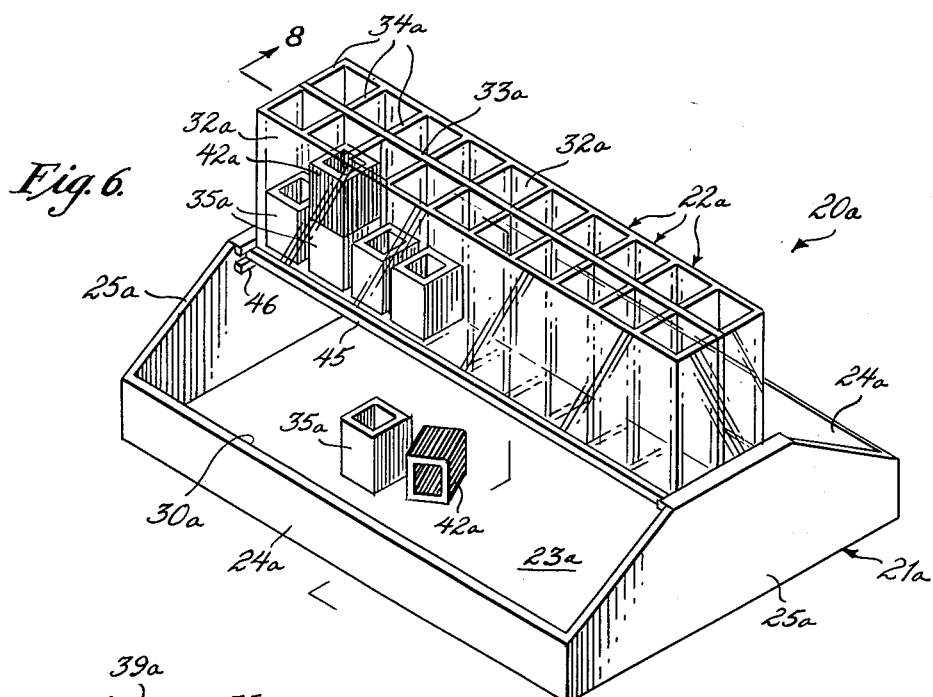
Fig. 6.
Fig. 7.
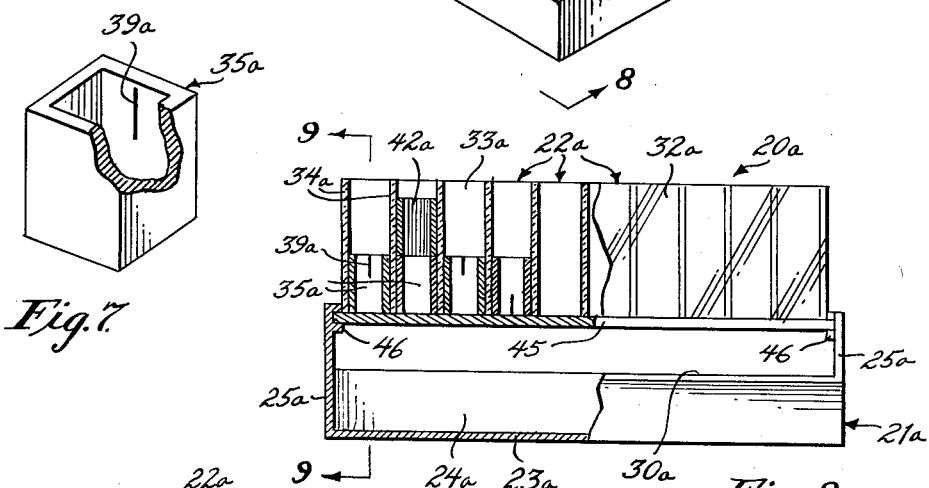
Fig. 8.
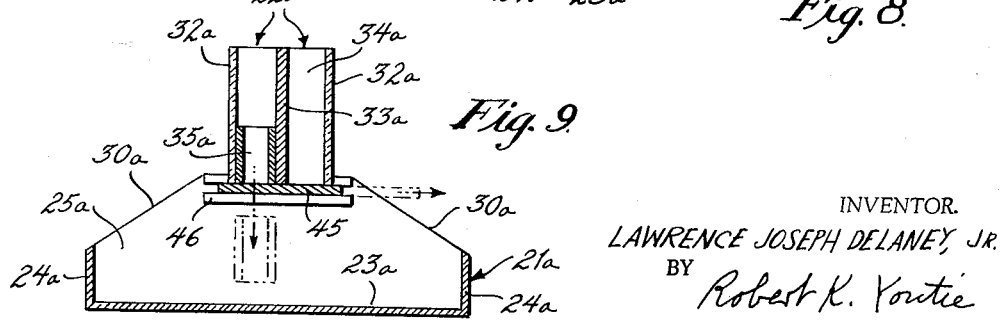
Fig. 9.
INVENTOR.
LAWRENCE JOSEPH DELANEY, JR.
BY Robert K. Youtie
ATTORNEY.

United States Patent Office 3,166,860
Patented Jan. 26, 1965

3,166,860
EDUCATIONAL TESTING DEVICE
Lawrence J. Delaney, Jr., 5160 Garfield Ave.,
Pennsauken, N.J.
Filed July 5, 1963, Ser. No. 292,875
11 Claims. (Cl. 35—48)

This invention relates generally to educational devices, and is especially concerned with a uniquely advantageous testing device for educational use.

As is well known in the field of education, the true degree of understanding or learning which occurs during the course of a lecture or lesson being taught is extremely difficult, if not impossible for the teacher to ascertain. Consequently, the speed and approach employed by the teacher may be entirely out of harmony with the reception and ability of the class, so that considerable teaching time and effort may be wasted.

Accordingly, it is an important object of the present invention to provide an educational test device adapted to be employed quickly and easily during instruction without loss of continuity, so that the teacher may have a reliable indication of the degree of understanding achieved by the class, for adjusting the instruction accordingly.

It is another object of the present invention to provide an educational testing device which is attractive to students so as to enhance class attentiveness, and which further serves to forcibly bring to the student's mind his own degree of learning during the lesson, and instantaneously reinforce the important points of the lesson.

The instant invention further contemplates the provision of an educational test device which is extremely simple to use, obviating the necessity for paper and pencil, collection and marking, and the like, which is self-scoring and relatively invulnerable to cheating.

It is still another object of the present invention to provide an educational test device having the advantageous characteristics mentioned in the preceding paragraphs, which is extremely simple in structure and durable in use, permits instantaneous monitoring of the class by the teacher, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a top perspective view illustrating a testing device of the present invention in an operative condition of use;

FIGURE 2 is a top perspective view illustrating an answer element of the instant invention;

FIGURE 3 is a top perspective view illustrating a correct choice element of the instant invention;

FIGURE 4 is a partial sectional elevational view taken generally along the line 4—4 of FIGURE 1;

FIGURE 5 is a partial top plan view of the device of FIGURE 1;

FIGURE 6 is a top perspective view showing a slightly modified construction of educational test device of the present invention in its operative condition of use;

FIGURE 7 is a top perspective view showing an answer element of the embodiment of FIGURE 6, partly broken away for clarity;

FIGURE 8 is a partial sectional view taken generally along the line 8—8 of FIGURE 6; and FIGURE 9 is a sectional elevational view taken generally along the line 9—9 of FIGURE 8 and showing an alternate operative condition in dot-and-dash outline.

Referring now more particularly to the drawings, and specifically to FIGURES 1–5 thereof, the educational device illustrated therein is generally designated 20, and includes a lower element or support 21, from which upstand a row or series of receivers 22.

The base 21 may comprise a hollow container having a bottom wall 23, front and back walls 24 and 25 upstanding from the front and rear edges of the bottom wall, and end walls 26 upstanding from opposite end edges of the bottom wall extending between the front and back walls. Thus, the front and back walls 24 and 25, and end walls 26 combine to extend peripherally about the bottom wall 23 and define an upwardly opening boxlike container structure.

The container or base 21 may include a top wall 28 in the nature of a lid having a depending circumferential flange 29, adapted to seat on the upper edges of the front, back and side walls 24–26, with the flange 29 embracing the front, back and side walls. The lid or cover 28 is provided with an opening or cutout 30 extending inward or forward from the rear edge and terminating short of the front edge, to afford manual access through the cutout into the interior of the hollow base or container 21.

The receivers 22 upstand from the lid or cover 28 in an aligned row or series forward of the cutout 30. The receivers 22 may be constituted of a generally vertical front wall 32 extending longitudinally along and spaced from the forward edge of the cover 28, and a generally vertical rear wall 33 in parallel, rearwardly spaced relation with respect to the front wall. Extending forwardly and rearwardly between the walls 32 and 33 are a plurality of parallel, laterally spaced generally vertical walls 34, extending between and generally normal to the front and rear walls 32 and 33. Thus, the walls 32, 33 and 34 combine to define the plurality of receivers 22, which are in the nature of generally parallel, upwardly opening tubular elements of rectangular or square internal cross section. The walls 32, 33 and 34 may all be fabricated of transparent material, such as plastic or the like, it being essential that at least a portion of the front wall 32 is transparent for visual access to the interiors of the tubular elements or receivers 22.

In FIGURE 2 is shown an answer element 35, which may be in the form of a block or body of rectangular hexahedral configuration, including a plurality of rectangular side walls or surfaces 36, and a pair of generally square end walls or surfaces 37. The end walls may be centrally recessed, as at 38, and each provided with suitable marking, such as an arrow 39. The answer elements 35 are configured for conformable engagement in the receivers 22, as by dropping through the upper end thereof in the direction of arrow 40 for free gravitational sliding of any answer element in a selected receiver. The external configuration of each answer element 35 is conformable to the internal configuration of the receivers 22, so as to maintain the answer elements in a particular orientation within the receivers, as inserted therein. This conformable engagement of answer elements 35 in receivers 22 prevents relative rotation therebetween.

In FIGURE 3 is shown a correct choice element 42, which may assume the form of a hollow, open-ended tube having an external diameter substantially equal to the end width or breadth of an answer element, for free sliding engagement in the receivers 22. Advantageously, the correct choice elements 42 may be of a distinctive color for quick visual recognition through the front receiver wall 32, and also provided with a through central opening 43, for a purpose appearing presently.

In use of the testing device 20, a plurality of answer elements 35 and correct choice elements 42 may be initially retained in the base 21. Each student in a class may have one of the testing devices, or certain selected students may each have a device, which devices are placed on the students' desks with the front receiver wall 32 facing toward the teacher. During the course of a lesson, the teacher may propound a multiple choice question suitable to ascertain the understanding achieved by the class. In response to the question, each student having a testing device will insert an answer element 35 downward into one of the receivers 22 through the open end thereof, say working from left to right; and, the student's choice of answer may be indicated by the orientation of answer element in the receiver, as indicated by the direction of arrow 39. Of course, both ends 37 of each answer element may be provided with suitable characteristic marking to afford a greater choice of orientations. For example, with the square answer element 35 of the illustrated embodiment in a square receiver 22, the answer element may be placed in any one of four selected orientations with one end up, and an additional four orientations with the other end up. Four such orientations are shown in FIGURE 5. Each orientation of the answer element 35 corresponds to one answer of a multiple-choice question. When the students have selected their answers and inserted the answer elements 35 in receivers 22 in an orientation corresponding to the selected answers, the teacher may then indicate the correct answer. As the answer elements 35 inserted in the receivers 22 are located in the lower ends thereof, and as the receivers are configured to prevent manual manipulation of the answer elements once inserted in the receivers, subsequent reorientation of an inserted answer element is prevented. Students having inserted an answer element 35 in accordance with the correct answer may then insert a correct choice element 42 in the same receiver 22 to rest on the answer element. The teacher may then quickly observe the percentage of correct choice elements employed to determine the efficacy of the teaching effort. Further, a student's indication of a correct answer may be quickly checked by visually observing downward through a correct choice element 42 to ascertain the indicated orientation of the nether answer element. This condition is best seen in FIGURE 5.

In the embodiment of FIGURES 6–9, a testing device is generally designated 20a, including a lower container-base 21a from which upstand a plurality of receivers or tubular elements 22a.

The base 21a may include a generally rectangular bottom wall 23a, and upstanding side and end walls 24a and 25a extending peripherally about the bottom wall. The end walls 25a may be substantially identical and of a height considerably greater than the side walls, having their upper edges tapering toward adjacent side walls.

The receivers 22a may be arranged in a pair of adjacent, parallel rows extending between and mounted on the upper regions of the end walls 25a, being spaced from the side walls 24a to leave hand openings 30a affording manual access to the interior of the base 21a and beneath the series or rows of receivers 22a.

More specifically, the plural rows of receivers 22a may be constituted of a pair of parallel spaced, generally vertical outer side walls 32a, each extending between and secured to opposite end walls 25a. An inner wall 33a is disposed in spaced relation between and generally parallel to the outer walls 32a, also being secured to opposite container end walls 25a. Extending normal to and between the outer and inner walls 32a and 33a are a plurality of generally vertical partitions or walls 34a, which combine with the outer and inner walls to define a plurality of generally parallel tubular elements of noncircular or square internal cross-sectional configuration and arranged in a pair of series or rows. Both the upper and lower ends of the tubular elements or receivers 22a may be open, and a generally horizontal lower end wall or closure 45 may be located beneath and in closing relation with all of the receivers 22a. Internally of the container end walls 25a, there may be provided ledges or guides 46 slidably supporting opposite ends of the bottom wall or closure 45 and permitting sliding withdrawal of the latter, as shown in FIGURE 9, to open the lower ends of the tubular elements or receivers 22a.

The test-device assembly 20a includes a plurality of answer elements 35a, which are shown as of open-ended, generally rectangular tubular configuration for conformable sliding engagement in the receivers 22a. The answer elements 35a are suitably marked, as at 39a to indicate orientation thereof relative to a receiving tubular element 22a.

In addition, a plurality of generally rectangular, open-ended tubular elements 42a may be provided corresponding to the correct choice elements 42 of the first-described embodiment.

In use, the testing device 20a may be employed in the same manner as described hereinbefore in connection with the testing element 20. However, the testing device 20a is of considerably greater capacity, having considerably greater number of receivers 22a in approximately the same space. Thus, when one row or series of receivers 22a has been used and is occupied with answer and correct choice elements 35a and 42a, the device 20a may be turned around, say 180 degrees about a vertical axis, to present the remaining row of receivers forward toward the teacher. The receiver walls 32a may advantageously be of transparent plastic, or other suitable light permeable construction for ready visual access by the teacher; and, the inner wall 33a may be relatively opaque or translucent to present only a single row of receivers to view from one side of the device.

As best seen in FIGURE 9, return of the testing device to its condition ready for reuse may be quickly and expeditiously accomplished by mere sliding of the closure 45 to open the lower ends of receivers 22a, whereupon the receivers fall into the container 21a.

From the foregoing, it is seen that the present invention provides a testing device for educational purposes which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An educational testing device comprising at least one upwardly opening receiver having visual access through at least one side, an answer element configured for selective insertion in said receiver in a plurality of predetermined orientations relative to said receiver, said answer element being marked to indicate the relative orientation thereof, and a correct choice element insertable into said receiver in position for viewing through said one side, said correct-choice element being configured to expose the answer-element marking when inserted in said receiver, whereby the answer to a test question may be indicated by the orientation of said answer element and the correctness of the answer indicated by the appearance of the correct choice element.

2. An educational test device according to claim 1, said receiver being of equilateral polygonal internal configuration, and said answer element being of equilateral polygonal external configuration, for said selective relative orientation.

3. An educational test device according to claim 2, said answer element being invertible relative to said receiver for additional selective relative orientation.

4. An educational testing device according to claim 1, said receiver comprising an upwardly opening tubular element.

5. An educational testing device according to claim 4, said tubular element being invertible to remove said answer and correct choice elements.

6. An educational testing device according to claim 4, in combination with an openable lower end closure on said tubular element for removing said answer and correct choice elements.

7. An educational testing device comprising a base, a row of tubular elements upstanding from said base and having their upper ends open, said tubular elements each having visual access means on at least one side, a plurality of answer elements configured for selective insertion in said tubular elements in a plurality of orientations relative to said tubular elements, said answer elements being marked to indicate the relative orientation thereof, and a plurality of correct choice elements insertable in said tubular elements in position for viewing through said visual access means, whereby the answers to test questions may be indicated by the orientation of said answer elements and the correctness of the answers indicated by the appearance of the correct choice elements.

8. An educational testing device according to claim 7, said base comprising a container for said answer and correct choice elements.

9. An educational testing device according to claim 8, said container having a hand opening for manual removal of said answer and correct choice elements from said container.

10. An educational testing device according to claim 9, in combination with closure means at the lower ends of said tubular elements and openable to communicate the latter with said container for discharging said answer and correct choice elements from said tubular elements to said container.

11. An aducational testing device according to claim 7, said tubular elements each being of equilateral polygonal internal configuration, and said answer elements each being of equilateral polygonal external configuration, for said selective relative orientation, said answer elements being marked to indicate said relative orientation.

References Cited by the Examiner

UNITED STATES PATENTS

| | | | |
|---|---|---|---|
| 1,177,891 | 4/16 | Pacouk | 220—20.5 |
| 2,809,443 | 10/57 | Hospodar | 35—73 X |
| 3,049,814 | 8/62 | McClain | 35—70 |

JEROME SCHNALL, *Primary Examiner.*

LAWRENCE CHARLES, *Examiner.*